United States Patent
Kim et al.

(10) Patent No.: US 10,435,230 B1
(45) Date of Patent: Oct. 8, 2019

(54) STORAGE CASE FOR CUTTING TOOL

(71) Applicants: Young Whi Kim, Seoul (KR); Kyu Young Bang, Siheung-si (KR)

(72) Inventors: Young Whi Kim, Seoul (KR); Kyu Young Bang, Siheung-si (KR)

(*) Notice: Subject to any disclaimer, the term of this patent is extended or adjusted under 35 U.S.C. 154(b) by 0 days.

(21) Appl. No.: 16/275,342

(22) Filed: Feb. 14, 2019

(30) Foreign Application Priority Data

Apr. 17, 2018 (KR) .................. 10-2018-0044196

(51) Int. Cl.
  *B65D 85/20* (2006.01)
  *B65D 85/02* (2006.01)
  *B23B 27/14* (2006.01)
(52) U.S. Cl.
  CPC ............. *B65D 85/02* (2013.01); *B65D 85/20* (2013.01); *B23B 27/14* (2013.01)
(58) Field of Classification Search
  USPC ......... 206/349, 378, 1.5, 446; 220/295, 298, 220/780; 215/317, 318
  See application file for complete search history.

(56) References Cited

U.S. PATENT DOCUMENTS

| | | | | |
|---|---|---|---|---|
| 5,031,765 A | * | 7/1991 | Chen .................... | A45D 29/023 |
| | | | | 132/73.5 |
| 5,605,242 A | * | 2/1997 | Hwang ................ | B65D 21/086 |
| | | | | 220/4.03 |
| 5,680,949 A | | 10/1997 | Roesler | |
| 5,829,591 A | * | 11/1998 | Lyons .................. | B65D 21/086 |
| | | | | 206/373 |
| 6,536,192 B2 | * | 3/2003 | King ...................... | B65D 51/26 |
| | | | | 206/349 |
| 8,079,487 B2 | * | 12/2011 | Roesler ................. | B25H 3/023 |
| | | | | 206/349 |

(Continued)

FOREIGN PATENT DOCUMENTS

KR   20-0335301 Y1   11/2003
KR   20-0412318 Y1   3/2006

(Continued)

*Primary Examiner* — Jacob K Ackun
(74) *Attorney, Agent, or Firm* — Lee & Associates, LLC; Jake K. Lee

(57) ABSTRACT

Disclosed is a storage case for a cutting tool, the storage case including a bit housing for receiving a tool bit of the cutting tool and a shank housing for receiving a shank, of which a lower end of the bit housing is overlapped with an upper end of the shank housing. A sleeve that is rotatably fitted on an upper portion of the shank housing, and the lower end of the shank housing is fitted onto an outer peripheral surface of the sleeve. An inner peripheral surface of the sleeve and an outer peripheral surface of an upper portion of the shank housing are provided with complementary recessed portions, in which in a process of rotating the shank housing while holding the bit housing, the recessed portions are not aligned with each other, and the sleeve gets wider outwardly to fix the bit housing, while the upper portion of the shank housing gets narrower inwardly to fix the shank. If the shank housing is rotated in a state in which the shank housing abuts against the bit housing at a right angle, the shank housing and the bit housing are fixed to each other, and the shank is elastically fixed to the inner peripheral surface of the bit housing.

3 Claims, 5 Drawing Sheets

(56) References Cited

U.S. PATENT DOCUMENTS

| | | | | |
|---|---|---|---|---|
| 2003/0155274 A1* | 8/2003 | Roster | ............... | B65D 25/101 |
| | | | | 206/591 |
| 2012/0118775 A1* | 5/2012 | Webb | ................ | B25H 3/006 |
| | | | | 206/349 |
| 2012/0279876 A1* | 11/2012 | Weigel | ............... | A45D 40/265 |
| | | | | 206/1.5 |
| 2019/0152649 A1* | 5/2019 | Hadar | ............... | B65D 21/086 |

FOREIGN PATENT DOCUMENTS

| | | |
|---|---|---|
| KR | 10-0930734 B1 | 12/2009 |
| KR | 10-2014-0027768 | 3/2014 |

\* cited by examiner

STORAGE CASE FOR CUTTING TOOL

CROSS-REFERENCE TO RELATED APPLICATIONS

This patent application claims priority under 35 U.S.C. § 119 to Korean Patent Application No. 10-2018-0044196 filed on Apr. 17, 2018, the entire contents of which are incorporated by reference herein.

TECHNICAL FIELD

The present invention relates to a storage case for a cutting tool, and more particularly, to a storage case for a cutting tool, the storage case including a shank housing to house a shank of the cutting tool and a bit housing to house a tool bit, in which if the shank housing is rotated in a state in which the shank housing abuts against the bit housing at a right angle, the shank housing and the bit housing are fixed to each other, and the shank is elastically fixed to an inner peripheral surface of the bit housing.

BACKGROUND

In general, a cutting tool for remove material from a metallic workpiece is used in a lathe or milling machine or a drilling machine, and is also referred as a bite of the lathe machine, a cutter of the milling machine, or a drill of the drilling machine, which are configured to remove material from a workpiece. In particular, an end mill used for the milling machine is a tool configured to cut a material from a workpiece in all directions, since the end mill has a cutting edge on a top surface and a side.

Since such a cutting tool is a sharp cutting edge which is sensitive to impact, the cutting tool or an operator can be damaged during distribution, and thus the cutting tool is kept in a storage case for the purpose of the distribution. The cutting tool should be easily kept in the case at packing. One example of the storage case for the cutting tool is disclosed in Korean Patent No. 930734, in which lower and upper cases for housing the cutting tool are integrally formed through injection molding to reduce manufacturing costs. The case includes the lower case and two opening members, and a lower end of each opening member is foldably connected to the lower case, and is provided with outward and inward protrusions.

The above case disclosed in the patent has some drawbacks in that since a shank of the tool is forcibly fitted into a standardized insertion portion of the lower case, the insertion portion is thermally deformed due to a temperature difference between night and day and seasons, in that since a dimensional deviation is not uniform depending upon variations in injection conditions, a holding degree is not constant, so that if a retaining force is strong, it is hard to put the cutting tool in or out away from the insertion portion, and in that when the cutting tool is pulled while holding the cutting edge, fingers may be cut. The insertion portion has a retaining force of about 1 kg so that the shank can be easily inserted into or retracted from the insertion portion. If the retaining force is weak, the shank of the cutting tool may be retracted from the insertion portion due to impact, for example, the case is dropped on a ground due to careless handling during distribution. In this instance, the cutting edge collides with the inside of the case, so that the cutting edge is damaged. Also, since the cutting tool moves in the case, the inside of the case is scratched, it has a bad appearance.

In the case of a conventional storage case including a bit housing and a shank housing, separately, since the shank is also pushed into the shank housing, it is hard to pack and unpack the cutting tool. In particular, since the storage case is configured to easily put the cutting tool in or out away therefrom, there is a limit of the retaining force. In the case where the storage case is dropped on the ground, the shank is extracted from the shank housing, and then collides with the inside of the storage case, so that the cutting edge is damaged, and the inside of the storage case is scratched, which deteriorates the merchantable quality thereof In addition, in order to prevent the shank housing from easily releasing from the bit housing, outer corners of the shank housing are provided with a plurality of latch bosses, and inner corners of the bit housing are provided with a plurality of locking grooves, so that the bit housing is engaged to the shank housing by engagement of the latch bosses and the locking grooves. However, since the latch bosses are released from the locking grooves by strongly pulling the shank housing, it causes inconvenience in use, for example, the shank housing should be pulled out with strong force.

SUMMARY

Therefore, the present invention has been made in view of the above problems, and one object of the present invention is to provide a storage case for a cutting tool, the storage case including a shank housing to house a shank of the cutting tool and a bit housing to house a tool bit, in which if the shank housing is rotated in a state in which the shank housing abuts against the bit housing at a right angle, the shank housing and the bit housing are fixed to each other, and the shank is elastically fixed to an inner peripheral surface of the bit housing. Since the bit housing loosely houses the tool bit, the bit housing can be easily pulled or pushed, and thus there is little possibility of an injury. Also, since the shank of the cutting tool is elastically pressed in the process of rotating the shank housing, the retaining of the shank is always provided.

In addition, in the process of rotating the shank housing, eccentric portions are not aligned with each other, and thus elastic retaining force is generated. The force is about 10 kg which is higher than the retaining force generated by the conventional case. Accordingly, even though the case is dropped on a ground due to careless handling, the shank is strongly elastically retained by the shank housing, so that the shank is not released from the shank housing to prevent the tool bit from being damaged.

According to one aspect of the present invention, there is provided a storage case for a cutting tool, the storage case including a bit housing for receiving a tool bit of the cutting tool and a shank housing for receiving a shank, of which a lower end of the bit housing is overlapped with an upper end of the shank housing, wherein a sleeve that is rotatably fitted on an upper portion of the shank housing, the lower end of the shank housing being fitted onto an outer peripheral surface of the sleeve; an inner peripheral surface of the sleeve and an outer peripheral surface of an upper portion of the shank housing are provided with complementary recessed portions, in which in a process of rotating the shank housing while holding the bit housing, the recessed portions are not aligned with each other, and the sleeve gets wider outwardly to fix the bit housing, while the upper portion of the shank housing gets narrower inwardly to fix the shank.

With the above configuration, the shank can loosely come in or out from the shank housing, and the bit housing can be loosely fitted onto the shank housing, so that when the tool is extracted from the storage case, it is not necessary to apply an excessive force to the case, thereby preventing accidents. The upper portion of the shank housing for receiving the shank is provided with the extension tube to press the outer peripheral surface of the shank, and the sleeve is fitted onto the outer peripheral surface of the extension tube. The sleeve is a portion onto which the inner peripheral surface of the bit housing is fitted.

In the process of rotating the shank housing, the sleeve is widened by the convex portions formed on the extension tube. The extension tube gets narrower by the reaction to fix the bit housing and the shank housing, and the shank is elastically fixed to the inner peripheral surface of the shank housing with the simple configuration. In addition, since the shank housing should be rotated by only quarter rotation, quick engagement can be obtained.

In addition, since the shank is elastically fixed to the shank housing, the strong retaining can be achieved. In particular, even though the cutting tool is applied by impact when the case is dropped on a ground due to careless handling, the shank of the cutting tool is not released from the shank housing, thereby preventing the tool bit and the storage case from being damaged and thus improving the reliability of the storage case.

Also, the convex portions of the extension tube protrude toward the inner peripheral surface of the sleeve, and the inner peripheral surface of the sleeve is provided with the inner convex portions protruding toward the extension tube, so that the convex portions abut against each other. Therefore, since there is an allowance higher than a dimensional variation which is caused by a temperature difference between night and day and seasons or injection conditions, strongly elastic engagement can be achieved which solves a manufacturing problem. In addition, it can substantially improve the problem of the conventional standardized interference-fitting case.

DETAILED DESCRIPTION OF THE DISCLOSURE

Hereinafter, one embodiment of the present invention will be explained in detail with reference to the accompanying drawings.

Figure 1:
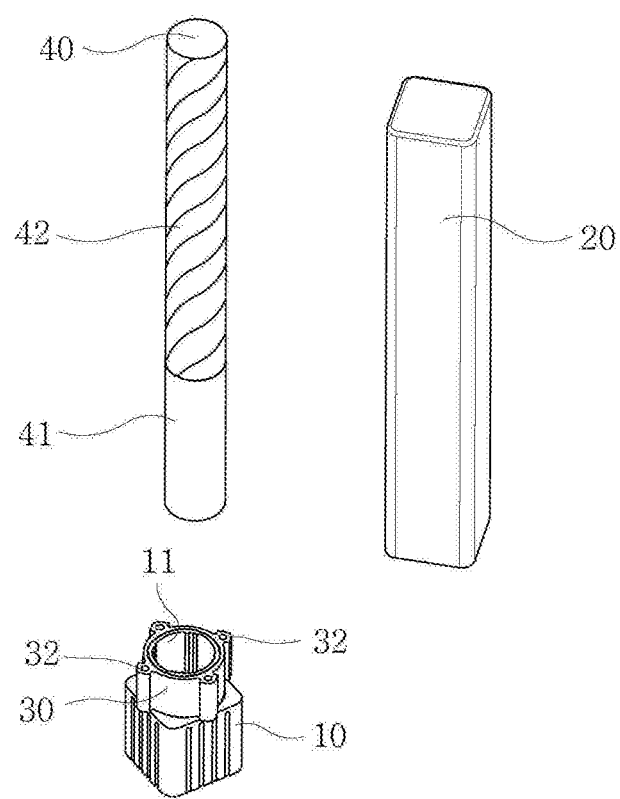
FIG. 1 is an exploded perspective view of a storage case according to one embodiment of the present invention.
Figure 2:
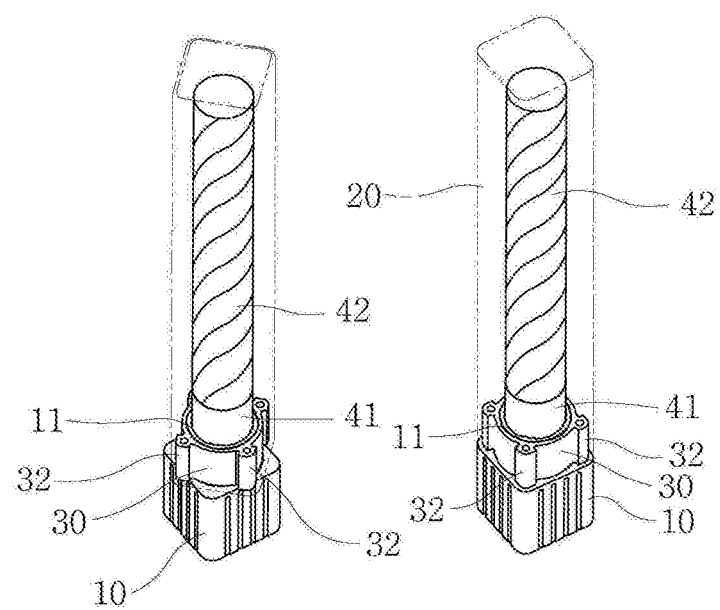
FIG. 2 is a perspective view illustrating a process of assembling the storage case according to the embodiment.
Figure 3:
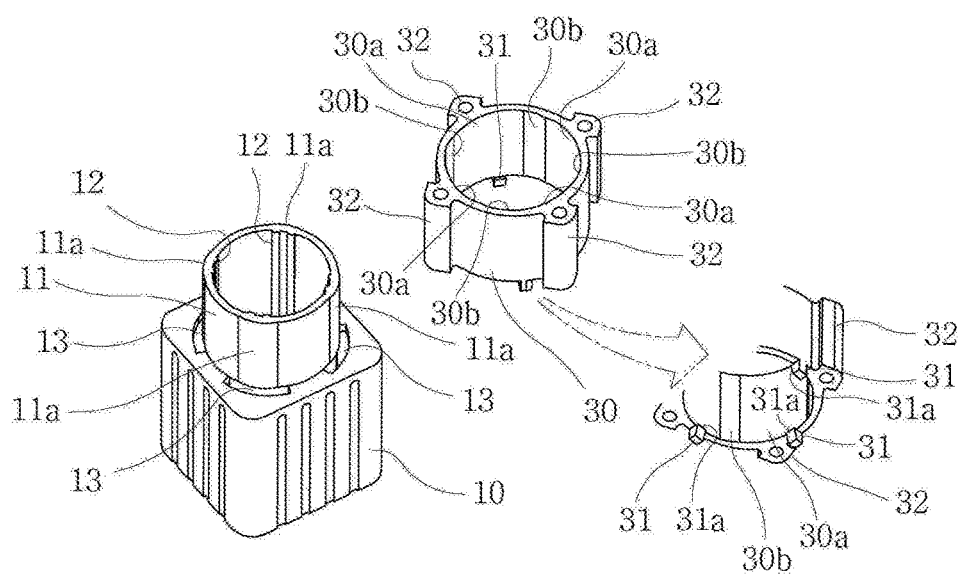
FIG. 3 is an exploded perspective view illustrating a shank housing of the storage case according to the embodiment.
Figure 4:
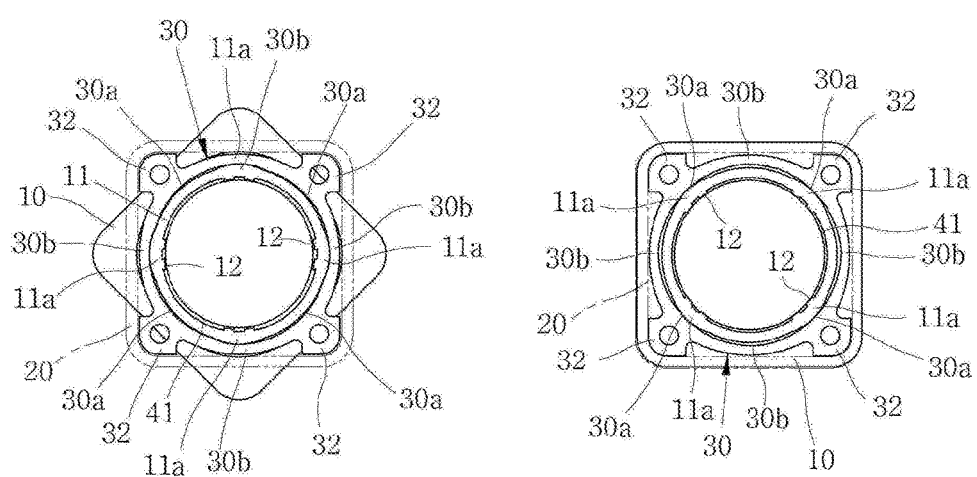
FIG. 4 is a cross-sectional view illustrating an operating state of the storage case according to the embodiment.
Figure 5:
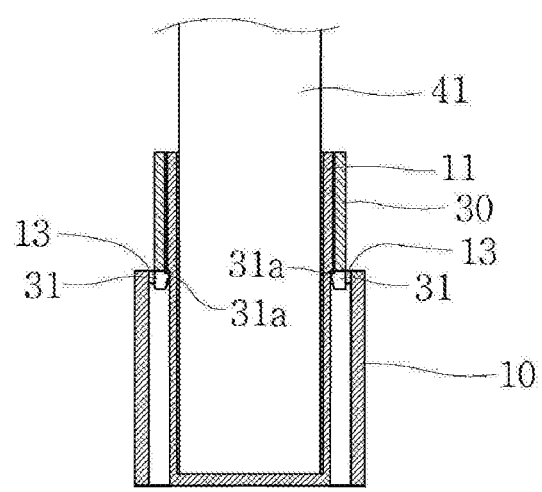
FIG. 5 is a cross-sectional view illustrating an assembled state of an extension tube and a sleeve.

Referring to FIGS. 1 to 5, a storage case according to one embodiment of the present invention includes a shank housing 10 and a bit housing 20, into which a shank 41 of a cutting tool 40 is loosely fitted. The shank housing 10 and the bit housing 20 are formed in a rectangular shape. The bit housing 20 has an opened lower end, into which the shank housing 10 is fitted, and the shank housing 10 has a cylindrical extension tube 11 at an upper end thereof A cylindrical sleeve 30 is rotatably fitted on the extension tube 11, and has a plurality of stoppers 31 at a lower end thereof. The upper end of the shank housing 10 is provided with guide holes 13 to guide rotation of the stoppers 31 which are fitted into the guide holes. The stoppers 31 determine an open or close position of the bit housing 20 and the shank housing 10. Specifically, if the shank housing 10 is rotated while holding the bit housing 20, the shank housing 10 is rotated along the guide holes 13, and then the stoppers 31 abut against a left or right end of each guide holes 13 to determine the open or close position. The lower end of each stopper 31 has a latch boss 31a which penetrates through the guide hole 13 and then is latched on a top surface of the shank housing 10, so that the sleeve 30 is rotated in pace, without being released from the extension tube 11.

An outer peripheral surface of the sleeve 30 is provided with corners 32 at four positions, into which four corners of an inner peripheral surface of the bit housing 20 are loosely fitted. An inner peripheral surface of the sleeve 30 is provided with an inner convex portions 30a protruding toward the extension tube 11 at a position corresponding to each corner 32. A plurality of inner concave portions 30b are radially formed between the inner convex portions 30a toward a direction away from the extension tube 11. The outer peripheral surface of the extension tube 11 is provided with a plurality of convex portions 11a protruding toward the inner peripheral surface of the sleeve 30, the convex portion 11a selectively coming into contact with the inner convex portions 30a and the inner concave portions 30b through the rotation of the shank housing 10.

If the convex portion 11a is overlapped with the inner concave portion 30b, the corners 32 of the sleeve 30 are not aligned with the corners of the shank housing 10, and thus the extension tube 11 and the sleeve 30 are not applied by an external force. In this instance, after the shank 41 is inserted into the shank housing 10 and then the lower end of the bit housing 20 is fitted on the sleeve 30 so that a tool bit 42 is covered by the bit housing 20, when the shank housing 10 is forwardly rotated, the corners 32 are aligned with the corners of the shank housing 10. In this instance, the convex portions 11a of the extension tube 11 are not aligned with the inner concave portions 30b of the sleeve 30, and then come into contact with the inner convex portions 30a. During the process, the inner peripheral surface of the sleeve 30 is received by an outward force, so that the corners 32 are elastically brought into contact with the corners of the bit housing 20. Simultaneously, the extension tube 11 is received by an inward force by the law of action and reaction, so that a plurality of protrusions radially formed on the inner peripheral surface are elastically brought into contact with the outer peripheral surface of the shank 41.

In the state in which the shank 41 is fixed to the shank housing 10 through the extension tube 11, and the bit housing 20 is fixed to the shank housing 10 through the sleeve 30, if the shank housing 10 is reversely rotated while holding the bit housing 20, the corners 32 are not aligned with the corners of the shank housing 10, and the convex portions 11a are overlapped with the inner concave portions 30b, so that a gap between the sleeve 30 and the extension tube 11 gets wider not to apply the external force to the sleeve 30 and the extension tube 11. Accordingly, the corners 32 comes away from the inner corners, and the shank 41 is released from the protrusions 12 of the extension tube 11, so that the bit housing 20 is easily retracted from the sleeve 30, and the shank 41 is also easily detached from the shank housing 10.

In the process of rotating the shank housing 10 in the forward direction while holding the bit housing 20, when the stoppers 31 abut against one end of each guide hole 13, the convex portions 11*a* are aligned with the inner convex portions 30*a*, so that the force of action and reaction becomes the highest level, which is the close position. By contrast, in the process of rotating the shank housing 10 in the reverse direction, if the stoppers 31 abut against the other end of each guide hole 13, the convex portions 11 a are positioned in the inner concave portions 30*b*, and thus the force of action and reaction goes away, which is the open position. The opening and closing operation is performed within the range of 45 degrees.

Although the storage case according to the embodiment of the present invention includes the rectangular bit housing 20 for receiving the tool bit 42, and the rectangular shank housing 10 for receiving the shank 41, the housings may be formed in various shapes, such as a cylinder, depending upon a shape of the cutting tool. The bit housing 20 is engaged to the shank housing 10 through the sleeve 30 provided on the shank housing 10.

At the early stage in which the bit housing 20 is not aligned with the shank housing 10, the corners 32 come away from the corners of the shank housing 10. After that, the shank 41 is inserted into the shank housing 10, and the inner peripheral surface of the bit housing 20 is fitted into the sleeve 30, so that the corners 32 are loosely fitted into the corners of the bit housing 20.

If the shank housing 10 is forwardly rotated by about 45 degrees, the stoppers 31 abut against one end of each guide hole 13. In this instance, the corners 32 are aligned with the corners of the shank housing 10, so that the corners of the bit housing 20 are aligned with the corners of the shank housing 10.

In the above process, the convex portions 11*a* of the extension tube 11 come away from the inner concave portions 30*b* of the sleeve 30, but are aligned with the inner convex portions 30*a*, so that the sleeve 30 gets wider in the outward direction, and the extension tube 11 gets narrower in the inward direction. Accordingly, the corners 32 formed on the outer peripheral surface of the sleeve 30 are elastically brought into contact with the inner corners of the bit housing 20, so that the bit housing 20 is fixed to the sleeve 30. The inner protrusions 12 of the extension tube 11 are elastically brought into contact with the outer peripheral surface of the shank 41, so that the shank 41 is fixed to the shank housing 10.

The bit housing 20 is fixed by the sleeve 30, and the sleeve 30 is fixed to the shank housing 10 by the stoppers 31 and the latch boss 31*a*. After all, the bit housing 20 and the shank housing 10 are integrally connected to each other, so that the cutting tool 40 is kept in the housings.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A storage case for a cutting tool, comprising:
    a bit housing to accommodate a tool bit of a cutting tool;
    a shank housing to accommodate a shank of a cutting tool;
    an extension tube having a cylindrical shape and mounted to an upper portion of the shank housing; and
    a sleeve which is rotatably coupled to the extension tube and to which a lower end of the bit housing is fitted, wherein;
    the sleeve is provided with a plurality of concave portions and convex portions on an inner peripheral surface thereof, and the extension tube is provided with a plurality of convex portions on an outer peripheral surface thereof, such that the convex portions of the extension tube come in contact with the concave portions or the convex portions of the sleeve when the shank housing rotates,
    wherein when the convex portions of the extension tube come in contact with the convex portions of the sleeve, the sleeve is outwardly wider to thereby fix the bit housing and the extension tube of the shank housing is inwardly narrower so as to fix the shank of a cutting tool,
    wherein the extension tube is further provided with a plurality of protrusions on an inner surface at positions corresponding to the plurality of convex portions thereof, the protrusions coming in contact with the shank of a cutting tool,
    wherein the lower end of the bit housing overlaps an upper end of the shank housing.

2. The storage case for a cutting tool according to claim 1, wherein a lower end of the sleeve is provided with a plurality of stoppers,
    the upper end of the shank housing is provided with a plurality of guide holes to allow the shank housing to rotate when the stoppers are inserted in the guide holes and
    the stoppers each have a latch boss which allows the stopper to be latched on the upper end of the shank housing through the guide hole, thereby preventing the sleeve from being released from the shank housing.

3. The storage case for a cutting tool according to claim 1, wherein the sleeve is provided with corners at the outer peripheral surface and inner corners of the bit housing are fitted into the corners of the sleeve.

* * * * *